United States Patent
Kollin et al.

(10) Patent No.: US 10,890,768 B2
(45) Date of Patent: Jan. 12, 2021

(54) POLARIZATION-BASED DYNAMIC FOCUSER

(71) Applicant: Microsoft Technology Licensing, LLC, Redmond, WA (US)

(72) Inventors: Joel Steven Kollin, Seattle, WA (US); Bernard Charles Kress, Redwood City, CA (US); Andreas Georgiou, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 16/160,831

(22) Filed: Oct. 15, 2018

(65) Prior Publication Data

US 2020/0117006 A1    Apr. 16, 2020

(51) Int. Cl.
*G02B 27/01*    (2006.01)
*F21V 8/00*    (2006.01)
(Continued)

(52) U.S. Cl.
CPC ....... *G02B 27/0172* (2013.01); *G02B 6/0036* (2013.01); *G02B 27/0179* (2013.01);
(Continued)

(58) Field of Classification Search
CPC .............. G02B 6/0036; G02B 27/0172; G02B 27/0179; G02B 27/281; G02B 2027/0127;
(Continued)

(56) References Cited

U.S. PATENT DOCUMENTS

| | | | |
|---|---|---|---|
| 2013/0242392 A1* | 9/2013 | Amirparviz | G02B 5/3058 359/485.05 |
| 2016/0131903 A1 | 5/2016 | Kollin | |

(Continued)

FOREIGN PATENT DOCUMENTS

| | | |
|---|---|---|
| EP | 3312659 A1 | 4/2018 |
| EP | 3351978 A1 | 7/2018 |
| WO | 2013138202 A1 | 9/2013 |

OTHER PUBLICATIONS

"International Search Report and Written Opinion Issued in PCT Application No. PCT/US19/052523", dated Dec. 5, 2019, 11 Pages.
(Continued)

*Primary Examiner* — William R Alexander
(74) *Attorney, Agent, or Firm* — Alleman Hall Creasman & Tuttle LLP

(57) ABSTRACT

A polarization-based dynamic focuser for a near-eye display includes a first polarizer configured to polarize environmental light incident on the first polarizer, such that environmental light passing through the first polarizer toward a user eye has a first polarity. An image source is positioned between the user eye and the first polarizer. The image source is transparent to the environmental light and is configured to output image display light toward the user eye, at least some of the image display light having a second polarity. A dynamic lens is positioned between the user eye and the image source, and is configured to selectively focus incident light having the second polarity toward the user eye at a controllable virtual distance, where the dynamic lens does not affect incident light having the first polarity.

17 Claims, 8 Drawing Sheets

(51) Int. Cl.
*G02B 27/28* (2006.01)
*G02F 1/29* (2006.01)

(52) U.S. Cl.
CPC .............. *G02B 27/281* (2013.01); *G02F 1/29* (2013.01); *G02B 2027/0127* (2013.01); *G02B 2027/0134* (2013.01); *G02B 2027/0178* (2013.01); *G02B 2027/0187* (2013.01)

(58) Field of Classification Search
CPC .... G02B 2027/0134; G02B 2027/0178; G02B 2027/0187; G02F 1/29
USPC .......................................................... 359/319
See application file for complete search history.

(56) References Cited

U.S. PATENT DOCUMENTS

| 2017/0090194 A1 | 3/2017 | Hayes |
| 2017/0184848 A1 | 6/2017 | Vallius |
| 2018/0129018 A1* | 5/2018 | Cheng .................. G02B 27/286 |
| 2018/0267309 A1* | 9/2018 | Klug .................. G02B 27/0101 |
| 2018/0356639 A1* | 12/2018 | Schaefer ............... G02F 1/1326 |

OTHER PUBLICATIONS

"Deep Optics", Retrieved from: http://www.deepoptics.com/do_site/, Retrieved on Aug. 21, 2018, 17 Pages.

"LUMUS", Retrieved from: https://lumusvision.com/, Retrieved on Aug. 21, 2018, 8 Pages.

"Lumus Announces Collaboration with Deep Optics, Combining Its Leading Transparent AR Displays with Dynamic Focal Technology", Retrieved from: https://www.businesswire.com/news/home/20171213005567/en/Lumus-Announces-Collaboration-Deep-Optics-Combining-Leading, Dec. 13, 2017, 2 Pages.

* cited by examiner

POLARIZATION-BASED DYNAMIC FOCUSER

BACKGROUND

Near-eye display devices (NEDs) can be used to provide augmented reality (AR) experiences and/or virtual reality (VR) experiences by presenting virtual imagery to a user eye. Virtual imagery can take the form of one or more virtual objects that are displayed such that they appear as if they are physical objects in the real world.

DETAILED DESCRIPTION

As described above, a head-mounted display device (HMD) may include a near-eye display (NED) to provide immersive imagery to wearers. An HMD may combine virtual imagery generated by a NED with a view of the surrounding physical environment in a "mixed" or "augmented" reality configuration (AR), or may replace at least a portion of a wearer's field of view with NED output in a "virtual reality" configuration (VR). The NED may assume various configurations that enable its output of virtual imagery.

A common problem that arises during use of NEDs is referred to as the vergence-accommodation mismatch. "Vergence" refers to movement of the eyes to focus on an object. "Accommodation" refers to a change in shape of the lens within each eye to focus light from the outside world on the retina. Vergence and accommodation are typically performed together—for instance, when an individual focuses on a real-world object, their eyes will move (vergence) to point toward the object, while their eye lenses will adjust (accommodation) such that light from the object is in focus.

However, in AR and VR settings, vergence and accommodation are often decoupled. While typical NEDs are able to present virtual images that stereoscopically appear at different depths, such NEDs can typically only present virtual objects at a single focal depth. This problem is particularly apparent in AR settings, in which the user may focus on a real-world object that is relatively close to the user's face, while virtual objects are presented at a different focal depth. While dynamic focusing elements can be used to change the apparent focal depth of the virtual imagery, this will also affect any environmental light from the real world passing through the NED. During prolonged use of NEDs, the vergence-accommodation mismatch can cause disorientation, headaches, nausea, and other undesirable side-effects.

Accordingly, the present disclosure describes a polarization-based dynamic focuser for a near-eye display that allows the apparent virtual distance of virtual imagery to be dynamically changed without significantly affecting the focus of inbound environmental light. Specifically, the polarization-based dynamic focuser includes a first polarizer that polarizes environmental light to have a first (e.g., vertical) polarization. An image source emits image display light toward a user eye, at least some of the image display light having a second (e.g., horizontal) polarization. A dynamic lens positioned in front of the user eye selectively focuses incident light having the second polarization without affecting light having the first polarization. Furthermore, the dynamic nature of the dynamic lens allows light having the second polarization to be selectively focused at a controllable virtual distance, without affecting the user's perception of the outside environment.

Figure 1:
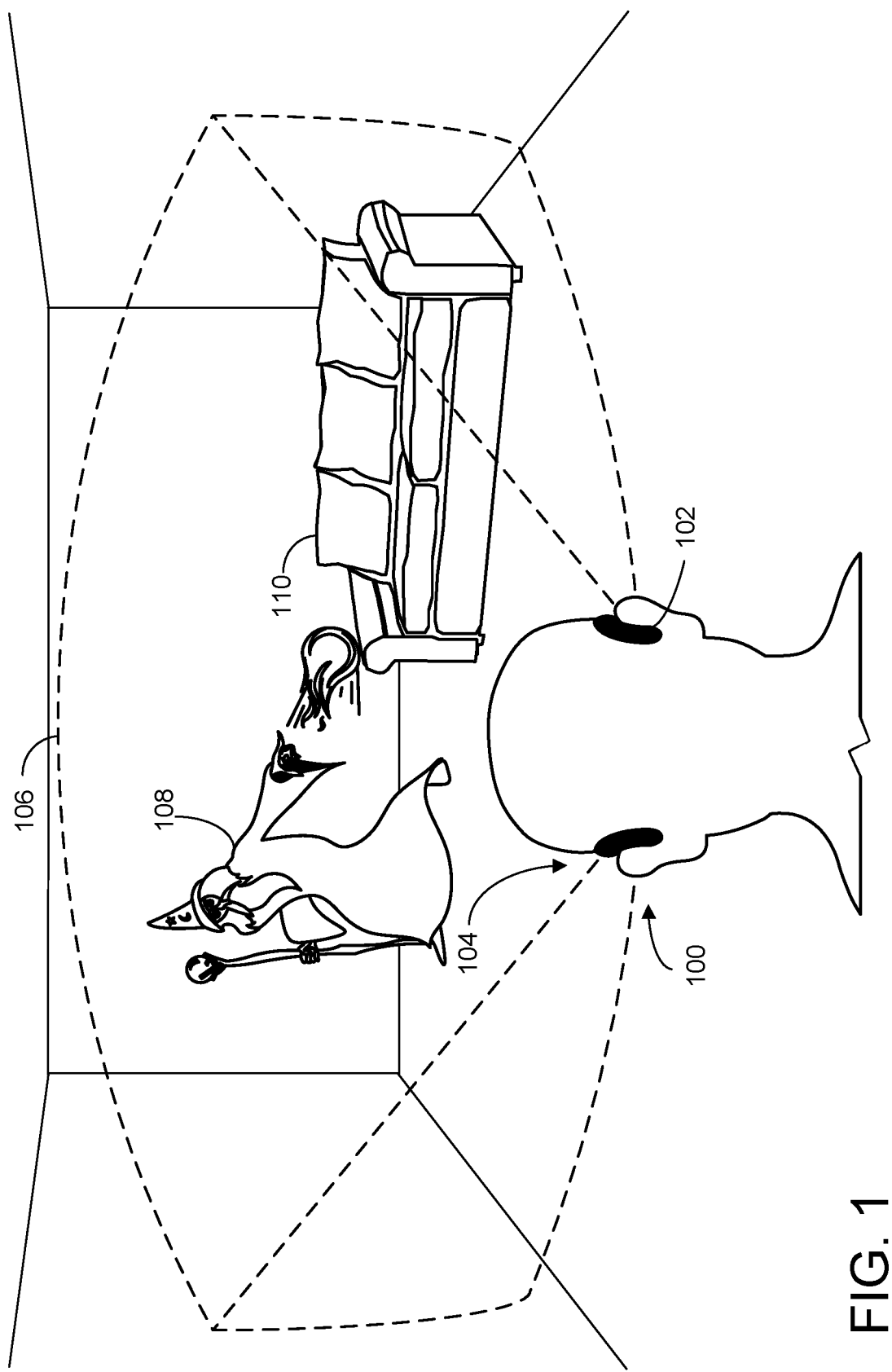
FIG. 1 schematically shows an example head-mounted display device including a near-eye display (NED).

FIG. 1 shows an example HMD device 100 in the form of a pair of wearable glasses 102 including a NED 104. NED 104 is configured as an augmented reality display in which virtual objects are superimposed over a view of a surrounding real-world environment. As an example, FIG. 1 shows virtual imagery 108 presented by NED 104 in field of view 106. FIG. 1 also shows a real-world object 110 that remains visible to the user during use of HMD 100.

HMD device 100 includes a controller (not shown in FIG. 1) for controlling NED 104. Among other potential operations, the controller may drive NED 104 to control the display of virtual imagery. The controller may include, or be coupled or associated with, a logic device and/or a storage device, examples of which are described below with reference to FIG. 8. In some examples, the controller may communicate with one or more devices remote from the HMD device.

The controller may interface with one or more sensors provided within or remotely from HMD device 100. The sensor(s) may include, but are not limited to, a microphone array, one or more outward facing image sensors, one or more inward facing image sensors (e.g., an eye/gaze tracking system), and an inertial measurement unit (IMU). As one example, the controller may use output from the IMU to adjust output from NED 104 that reflects movement of the wearer in such a manner that the virtual imagery appears to be physically present in the surrounding environment. As another example, the controller may cause display of a view of the surrounding physical environment on NED 104 captured via outward facing image sensors in a stereo arrangement, which may enable the determination of depth. In this example, NED 104 may present a mixed reality environment in which virtual imagery is superimposed over the captured view of the physical environment.

The example display systems described herein also may be implemented in devices other than HMD device 100. Examples of such devices may include other HMD devices, other wearable devices, mobile non-wearable devices, and stationary devices.

Figure 2A:
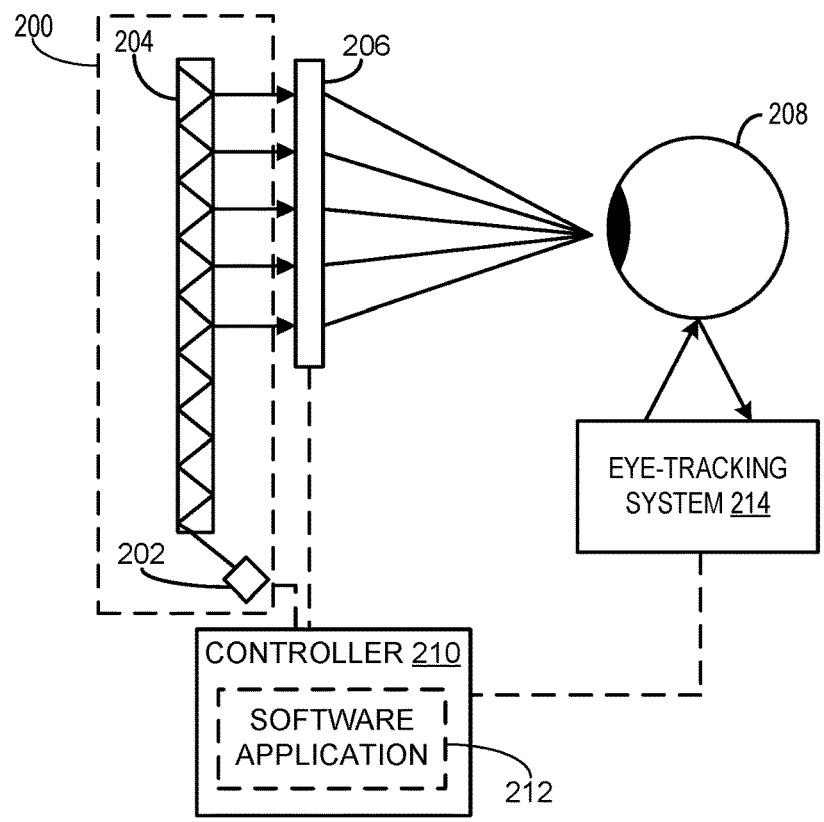
FIGS. 2A and 2B schematically show an example image source that may be implemented in the NED of FIG. 1.

FIG. 2A shows an example image source 200 that may be implemented in NED 104. Image source 200 includes a microprojector 202 and a waveguide 204. Image source 200 outputs light to a focusing element 206, which focuses light toward a user eye 208.

In general, image source 200 is operable to project image display light toward a user eye and provide an eyebox in which virtual imagery output by the image source is viewable. Image source 200 may correspond to a single eye and may in some cases be paired within a NED and/or HMD with a second, similar image source for displaying imagery to a second eye. It will be understood that FIG. 2A shows the example image source schematically and is not drawn to scale. In alternative examples, different image sources or image forming technologies may be used, including optical combiners (e.g., waveguide combiners, free-space combiners). As used herein, "image source" refers to any hardware suitable for directing image display light toward a user eye. FIGS. 2B-8 are similarly schematic in nature.

Image source 200 includes a microprojector 202 configured to output light into a waveguide 204. While not depicted in FIG. 2A, an in-coupling element may be provided to facilitate in-coupling of light into waveguide 204. Microprojector 202 may output collimated light, which in some examples may be spatially modulated to create an image. In addition to or as an alternative to microprojector 202, image source 200 may include any suitable optics for outputting light for creating and projecting images. The microprojector 202 further may include image-producing optics, such as a spatial light modulator for creating an image. In general, however, any suitable source may be used to output light to other components in a NED, whether the light does or does not encode an image.

Once within the waveguide, light may propagate via total internal reflection before reaching an outcoupling element. In the illustrated example, the waveguide replicates an exit pupil of the image display light as the image display light propagates away from the microprojector. This serves to increase a size of the eyebox within which the image display light is viewable. A variety of suitable outcoupling elements may be used. For example, the image source may include a waveguide having surface relief gratings for outcoupling image display light from the waveguide. Alternatively, the waveguide may include a holographic optical element for outcoupling image display light. Such a holographic optical element may include suitable thick or thin holograms, such as diffractive optical elements, kinoforms, volume Bragg gratings, switchable Bragg gratings, metamaterial structures, and/or other static or dynamic technologies that can act as a thin or thick hologram.

Furthermore, while image source 200 includes a waveguide, it will be understood that other suitable optical elements may be used. For example, an alternative image source may utilize a direct-view display, scanning mirror/scanning fiber devices, etc., provided image display light is suitably directed toward the user eye.

In the illustrated example, image source 200 emits collimated light rays toward the user eye. Thus, upon leaving waveguide 204, the image display light may be said to have an infinite virtual distance, which when viewed directly by the user would correspond to a virtual image that appears to be a significant distance (e.g., more than three meters) away from the user. Focusing element 206 is used to focus the light rays before reaching the user eye, thereby altering the virtual distance of the image display light. Any suitable focusing element may be used, including fixed or dynamic (e.g., switchable or tunable) lenses. As one example, a dynamic lens may be used that is controllable to modify a virtual distance of the image display light. Among other suitable technologies, the dynamic lens may be implemented as a liquid crystal lens or an Alvarez lens. Furthermore, in FIG. 2A, a gap is shown between the waveguide and focusing element. It will be understood that this is shown only for the sake of illustration, and that, depending on the implementation, there may be any suitable spacing between the image source and focusing element, including no gap whatsoever.

Light focused by focusing element 206 enters user eye 208 and strikes a user retina, causing the light to be perceived by the user as an image. Though FIG. 2A depicts the light focusing at a point outside of the human eye pupil, this is for illustration purposes only. In practical use, the light may converge toward a focal point having any suitable position. Light entering the eye pupil may be focused by the eye lens to further modify the light's virtual distance, for example to focus the light at the retina.

As discussed above with respect to FIG. 1, light striking the eye retina may be perceived by the wearer as an image, such as virtual imagery 108. When light is stereoscopically projected toward both wearer eye retinas at once, the virtual imagery may be perceived as a three-dimensional object that appears to exist at a three-dimensional position within the wearer's environment.

Figure 2B:
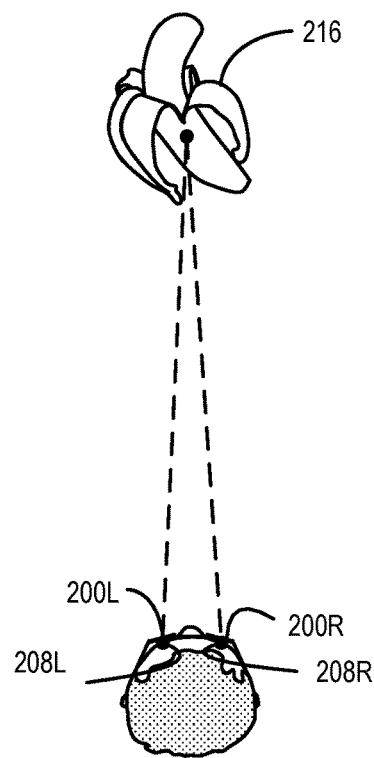

This is shown in FIG. 2B, which shows an overhead view of a wearer using a NED. As shown, the NED includes two image sources, including a first image source 200L positioned in front of the wearer's left eye 208L, and a second image source 200R positioned in front of right eye 208R. It will be understood that image source 200 shown in FIG. 2A may be either of image sources 200L and 200R. Similarly, human eye 208 shown in FIG. 2A may be either of eyes 208L and 208R shown in FIG. 2B. A virtual image 216 is visible to the wearer as a virtual object present at a three-dimensional position some distance away from the wearer. As discussed above, such an image may be formed via light emitted by image sources 200L and 200R entering human eyes 208L and 208R.

Returning to FIG. 2A, the light from image source 200 may be substantially monochromatic or multi-color (e.g., red, green, blue). In other words, the image display light may include one or more narrow wavelength bands corresponding, for example, to white light, discrete red, green, and blue color channels, etc. In some examples that utilize multi-color light, microprojector 202 may perform color field-sequential display. For implementations in which aberration correction components are used to correct for any aberrations in the exit pupil (e.g., caused by steering of the exit pupil), such components may be independently controlled for each color channel to provide aberration correction suited for each color channel. One example of such corrective components may include a phase modulating display panel, such as a transmissive liquid crystal panel or a reflective liquid crystal on silicon (LCOS) display. Other corrective elements may include a liquid crystal lens, a micromirror array, and a deformable mirror, as examples.

In some examples, microprojector 202 may be controlled by a controller 210 to form the virtual image. Controller 210 may be implemented as any suitable processing componentry including, for example, logic machine 802 described below with respect to FIG. 8. Furthermore, in some implementations, controller 210 may be configured to execute a software application 212, and may control the image formed by microprojector 202 based on instructions received from the software application. In other words, the image display light may depict a virtual image rendered by software application 212. Nonlimiting examples of software application 212 may include a device operating system, system utilities, device firmware/drivers, pre-installed applications, user-installable applications (e.g., games, tools, interactive experiences), etc.

As discussed above, focusing element 206 may in some cases be a dynamic lens that is controllable to dynamically set the apparent virtual distance of the image display light. In some examples, the dynamic lens may be controlled by controller 210. Such control may take any suitable form depending on how focusing element 206 and controller 210 are implemented. In a typical example, a signal applied to the dynamic lens (e.g., an electrical voltage or current) will change the shape of the dynamic lens in a predictable manner, thereby changing the focusing properties of the lens. In some cases, control of the focusing element may be done in accordance with instructions provided by software application 212.

FIG. 2A also includes an eye-tracking system 214 configured to track a current position of the human eye. From the position of the eye (e.g., a pupil position), the eye-tracking system may infer a gaze vector of the eye, which may be used to infer where the user's attention is directed within a real or virtual scene. In some examples, eye-tracking system 214 may include a light source that projects light onto the eye, and an image sensor that captures light reflected from the cornea with which glints and/or other features can be identified to determine the pupil location. The eye position identified by eye-tracking system 214 may be provided to controller 210, which may be configured to modify the image display light and/or control the focusing element based on the current eye position. For instance, if the eye gaze vector indicates that the user is looking at a real or virtual object that is relatively close to the user, then the controller may adjust the dynamic lens such that the image display light has a closer virtual distance.

It will be understood that the components and arrangements shown in FIG. 2A are presented for the sake of example and are not limiting. Any or all components depicted in FIG. 2A may in alternate implementations be omitted, modified, or replaced provided image display light is still suitably directed toward the user eye.

Figure 3A:
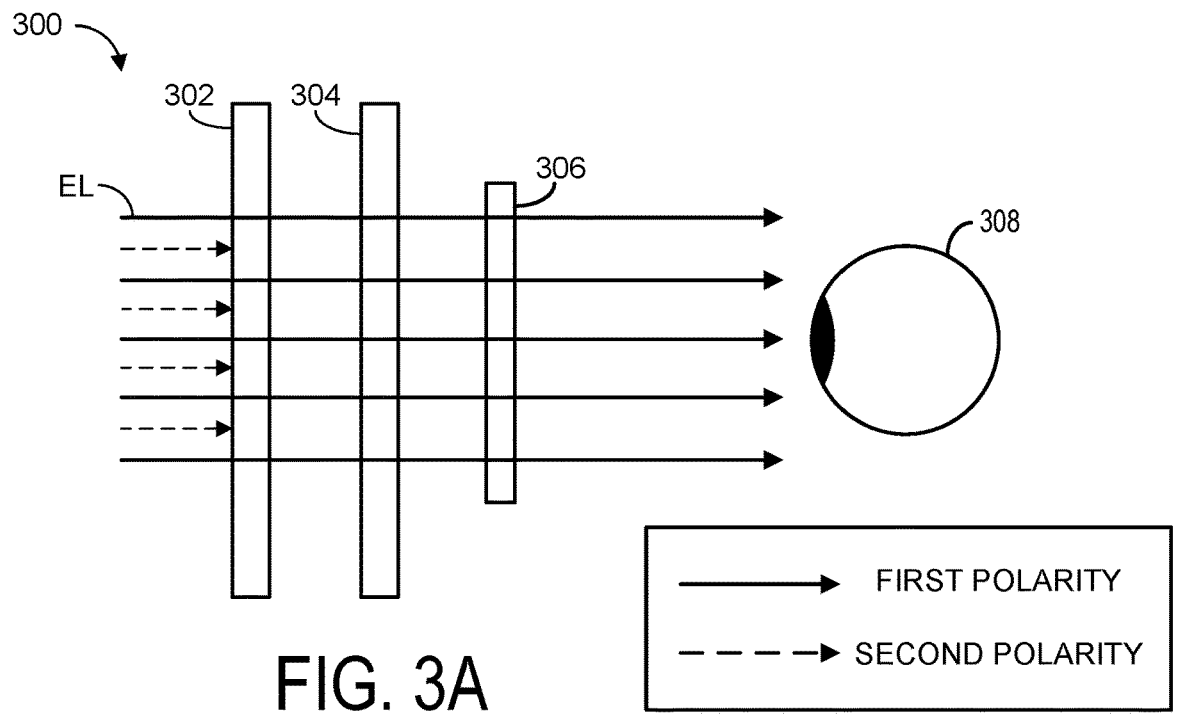
FIGS. 3A and 3B schematically illustrate propagation of environmental and image display light through an example polarization-based dynamic focuser.
Figure 3B:
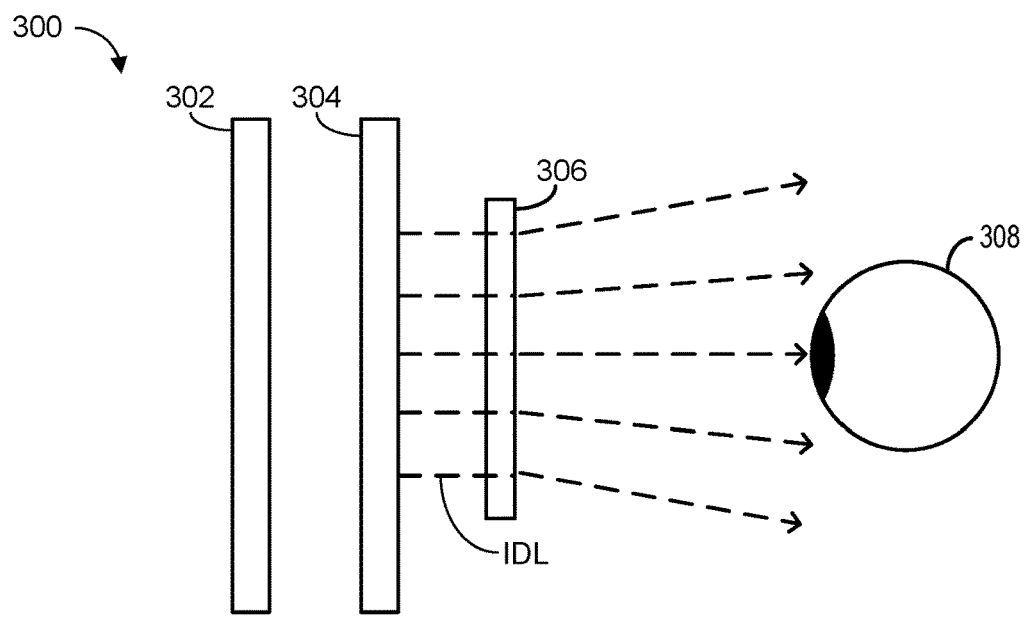

FIGS. 3A and 3B schematically depict an example polarization-based dynamic focuser 300 including a first polarizer 302, an image source 304, and a dynamic lens 306. Polarization-based dynamic focuser 300 is positioned in front of a user eye 308. Image source 304 is positioned between the first polarizer and the user eye, while dynamic lens 306 is positioned between the image source and the user eye. Though gaps are shown between the various components in polarization-based dynamic focuser 300, it will be understood that this is for illustration purposes only. There may be any suitable spacing between the first polarizer, image source, and dynamic lens, including no gaps whatsoever.

In FIG. 3A, environmental light EL from an outside environment is passing through polarization-based dynamic focuser 300 to reach user eye 308, allowing the user to see the outside environment. In FIG. 3B, image source 304 is emitting image display light IDL toward the user eye, which is focused by dynamic lens 306 to have a particular virtual distance. It will be understood that, in typical usage, environmental light EL and image display light IDL may pass through the polarization-based dynamic focuser at the same time. The environmental light and image display light are only shown separately in FIGS. 3A and 3B for visual clarity.

As shown in FIG. 3A, environmental light EL includes two polarities of light. A first polarity is shown in solid lines, while a second polarity is shown in dashed lines. In one example, the first polarity corresponds to vertical polarization while the second polarity corresponds to horizontal polarization. However, it will be understood that the first and second polarities may correspond to any polarities of light found within environmental light, including horizontal, vertical, and circular (e.g., clockwise and anticlockwise) polarities.

First polarizer 302 is configured to polarize environmental light incident on the first polarizer, such that environmental light passing through the first polarizer toward the user eye has the first polarity. In some examples, the first polarizer may be a broadband polarizer configured to polarize substantially all visible wavelengths of environmental light incident on the broadband polarizer to have the first polarity. This is illustrated in FIG. 3A, in which all environmental light rays having the first polarity pass through the first polarizer, while all rays having the second polarity fail to pass through the first polarizer. Alternatively, however, the first polarizer may have some degree of wavelength selectivity, meaning some wavelengths of light having the second polarity are able to pass through the first polarizer.

The first polarizer may utilize any static or dynamic polarizing optics to achieve polarization of the environmental light. For example, light having the second polarity may be absorbed by the first polarizer, reflected, diffracted at an angle that carries the light away from the user eye, etc. Furthermore, the polarizing properties of the first polarizer may vary across the surface of the polarizer. In other words, some regions of the first polarizer (e.g., the center) may polarize environmental light to have the first polarity, while other regions of the first polarizer (e.g., the edges) may polarize the light to have the second polarity, or may not polarize the light at all. As will be discussed below with respect to FIGS. 6A and 6B, the first polarize may in some cases be dynamically switchable to selectively increase or decrease an amount of environmental light that passes through the first polarizer toward the user eye.

Continuing with FIG. 3A, after passing through the first polarizer, environmental light EL having the first polarity continues to propagate through the polarization-based dynamic focuser toward the user eye. Image source 304 is transparent to the environmental light, allowing the environmental light to pass through the image source to the user eye unaffected. Furthermore, as shown, dynamic lens 306 does not affect incident light having the first polarity. In other words, environmental light EL having the first polarity reaches the user eye without being substantially affected by passing through the image source and dynamic lens. This allows the user to have a substantially unaffected view of the outside world (e.g., focus is not modified by dynamic lens 306), save for a reduction in brightness associated with polarization of the environmental light by the first polarizer.

Turning now to FIG. 3B, image source 304 outputs image display light IDL toward the user eye. Image source 304 may be implemented as any combination of optical elements that emits image display light while remaining substantially transparent to environmental light. As one example, image source 304 may be implemented as image source 200 described above with respect to FIG. 2A.

In general, it is beneficial for the image source to emit image display light that has an opposite polarity from the environmental light passing through the first polarizer. Accordingly, when the environmental light is polarized to have the first polarity, at least some of the image display light should have the second polarity. For example, the image source may emit non-polarized image display light, meaning some but not all of the image display light has the first polarity (e.g., the first and second polarities may be equally represented). In such cases, a second polarizer may be used, as will be described in more detail below with respect to FIG. 5. Ideally, however, substantially all of the image display light output by the image source will have the second polarity, as is illustrated in FIG. 3B.

After being output by the image source, the image display light passes through dynamic lens 306 on its way to user eye 308. The dynamic lens is configured to selectively focus incident light having the second polarity toward the user eye at a controllable virtual distance. This is illustrated in FIG. 3B, as image display light passing through the dynamic lens changes from being collimated to slightly diverging. Similar to focusing element 206 described above, dynamic lens 306 may be implemented as any suitable dynamically controllable focusing element that is birefringent (i.e., polarity-selective). As examples, the dynamic lens may be implemented as a liquid crystal lens, polarization hologram, or polarization-selective Alvarez lens.

Figure 4A:
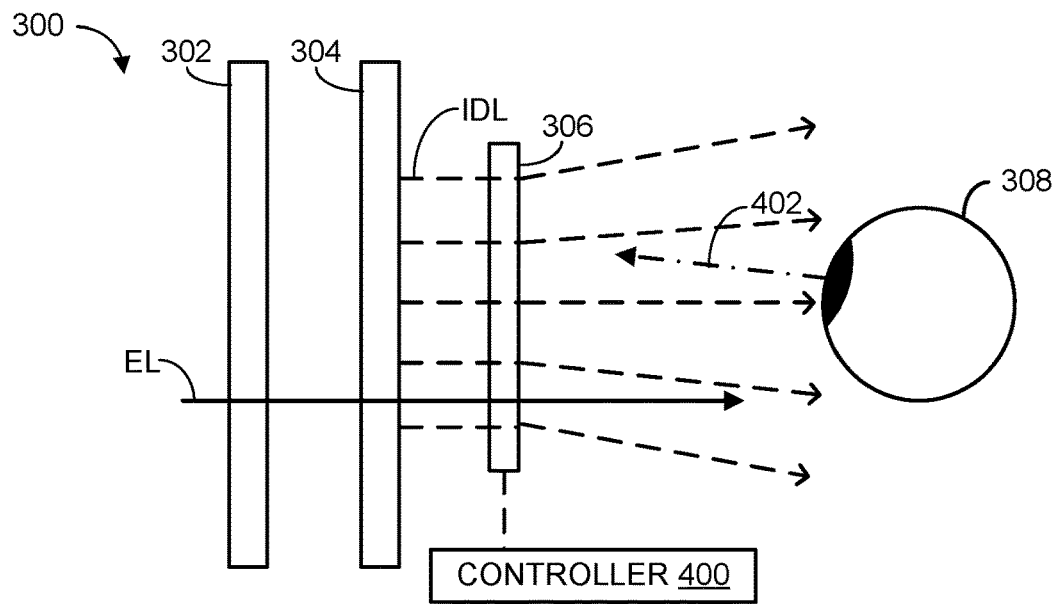
FIGS. 4A and 4B schematically illustrate selective focusing of image display light by a dynamic lens.
Figure 4B:
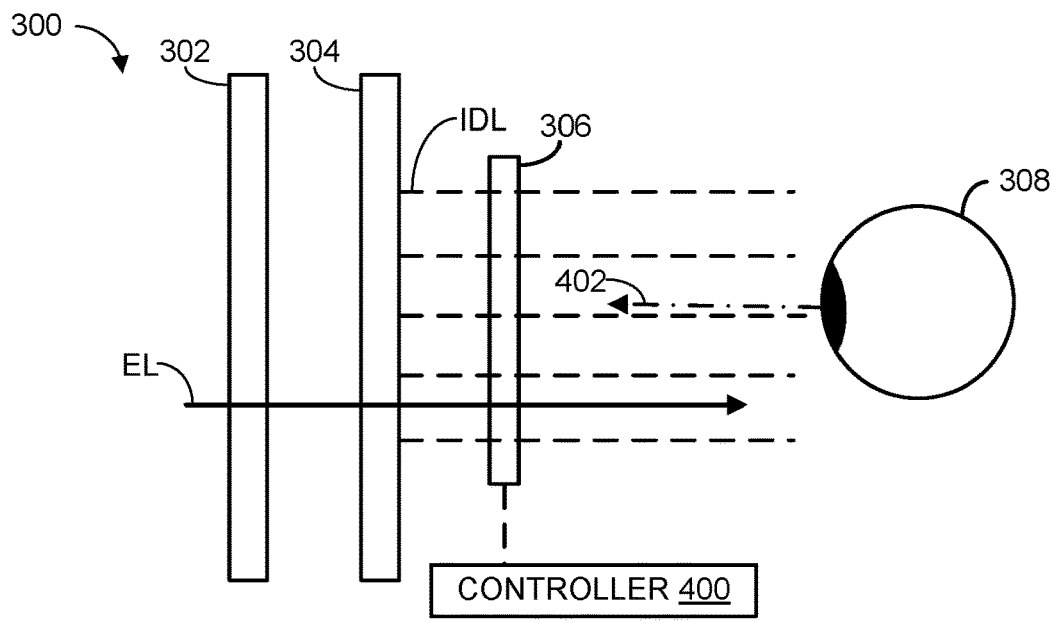

FIGS. 4A and 4B schematically illustrate dynamic focusing of the image display light to a controllable virtual distance. FIG. 4A again shows polarization-based dynamic focuser 300 positioned in front of user eye 308. Image display light IDL emitted by image source 304 is focused by dynamic lens 306 to create a virtual image closer to the front of user eye 308. Meanwhile, a single ray of environmental light EL is shown passing through the polarization-based dynamic focuser to illustrate that the user can still see the outside environment while viewing virtual imagery, and that incident light having the first polarity is not affected by the dynamic lens.

In FIG. 4B, however, the dynamic lens has been switched off so as not to change the virtual distance of the image display light. As shown, the image display light remains collimated to present a virtual image that lies at optical infinity. Accordingly, the virtual distance of image display light shown in FIG. 4B is consistent with light from a real-world object that is a significant distance from the user, while the image display light shown in FIG. 4A is consistent with a real-world object that is relatively closer than the image display light from FIG. 4B.

For some kinds of dynamic lensing elements, the physical shape of dynamic lens 306, and therefore the current virtual distance of the image display light, is controlled by a controller 400. As with controller 210, controller 400 may be implemented via any suitable processing technology, including logic machine 802 described below with respect to FIG. 8. Controller 400 may in some cases also control the image source to form the virtual image, or another controller may be used for this purpose. As discussed above, any suitable control signal may be used to control the dynamic lens. In a typical example, the controller will output an electrical signal (e.g., a change in voltage or an electrical current) that causes the shape of the dynamic lens to change in a predictable manner, thereby affecting the virtual distance of the image display light.

In general, the virtual distance of the image display light will be changed based on where the user's attention is currently directed. For example, if the user is focused on a real-world object that is relatively close to the user, then the image display light should have a virtual distance that approximately matches the real-world distance between the user and the real-world object. Thus, as the user looks at the real-world object, virtual imagery presented to the user should appear to be in focus, helping to alleviate the vergence accommodation mismatch. Similarly, when the user's attention is directed to a more distant point or object, the focal plane of the image display light should similarly be far from the user.

In one example, the controllable virtual distance of the dynamic lens may be set based on a current gaze vector of a user eye. As discussed above with respect to FIG. 2A, an eye-tracking system may be used to determine a current position (e.g., pupil position) of the user eye, from which a gaze vector of the user eye may be inferred. When a user focuses on a relatively near point or object, their eye gaze vectors will converge at a point in front of the user's face. In contrast, when a user focuses on a more distant point or object, the eye gaze vectors will be approximately parallel. In FIG. 4B, the eye gaze vector 402 extends approximately straight away from the user's face, meaning the user is likely focused on a relatively distant point. Accordingly, the image display light is collimated, consistent with a distant object. In FIG. 4A the eye gaze vector is consistent with the user focusing on a relatively closer point, and the image display light is slightly diverging, consistent with a closer object.

Additionally, or alternatively, the controllable virtual distance of the dynamic lens may be set based on an indication of user focus provided by a software application. For example, a virtual reality application (e.g. software application 212) running on an HMD may cause virtual imagery to be presented that appears, stereoscopically, to be positioned relatively close to the user, and instruct the user to interact with the virtual imagery. For example, the user may navigate menus, play a game, manipulate virtual tools, etc. Based on this information, controller 400 may control the dynamic lens to focus the image display light consistent with a relatively nearby virtual object. In other words, control of the dynamic lens may depend on the virtual content currently presented by the NED. Similarly, when the software application indicates that the user is manipulating or observing virtual objects that are relatively far away (e.g., a virtual television screen), the image display light may be focused consistent with a distant real-world object. In general, however, the dynamic lens may be controlled in any suitable way, and according to any suitable criteria.

As indicated above, it is ideal for the image source to emit image display light that is polarized to have an opposite polarity from environmental light passing through the first polarizer. In other words, when the environmental light has a first polarity, it is beneficial for substantially all of the image display light to have the second polarity. This is due to the fact that any image display light having the first polarity will not be focused by the dynamic lens, which can cause the user to perceived doubled, offset, or blurry virtual images. However, it is not always possible or even practical to completely polarize the image display light. In other words, in practical implementations, some but not all of the image display light may have the first polarity.

Figure 5:
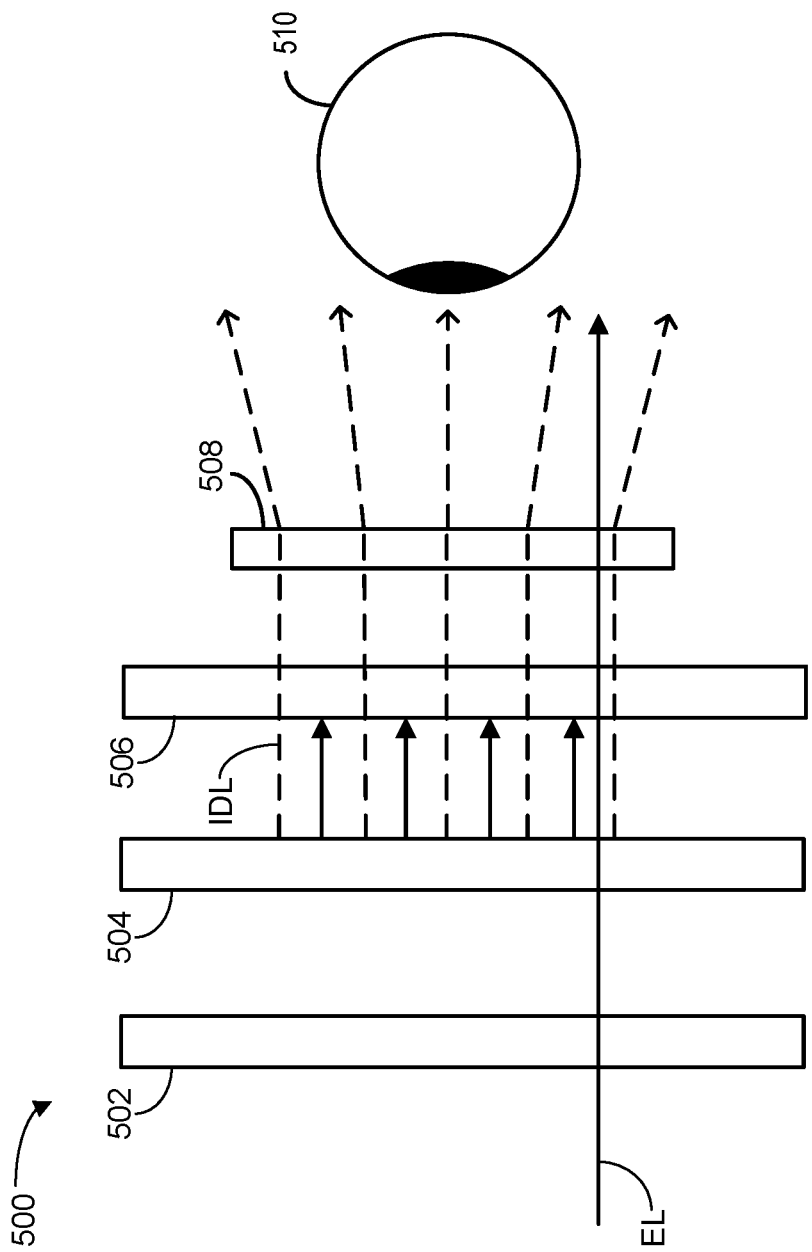
FIG. 5 schematically depicts another example polarization-based dynamic focuser.

This is schematically illustrated in FIG. 5, which shows another example polarization-based dynamic focuser 500, once again including a first polarizer 502, image source 504, and dynamic lens 508 positioned in front of a user eye 510. However, unlike polarization-based dynamic focuser 300, focuser 500 includes a second polarizer 506 positioned between the dynamic lens and the image source. The second polarizer is configured to polarize one or more wavelengths of incident light to have the second polarity. In other words, any image display light having the first polarity will fail to pass through the second polarizer, and thus never reach the user eye. In FIG. 5, the image display light IDL output by image source 504 includes both first and second polarities of light. However, light having the first polarity does not pass through second polarizer 506.

Notably, the second polarizer may be configured to only polarize one or more narrow wavelength bands, which will typically exclude many wavelengths of environmental light that pass through the first polarizer. This is shown in FIG. 5, in which a ray of environmental light EL having the first polarity passes through the second polarizer unaffected. For example, as discussed above, the image source may emit multi-chromatic light having discrete red, green, and blue channels. Thus, the second polarizer may be implemented as a narrowband polarizer that only affects wavelengths of light corresponding to the red, green, and blue channels used by the image source. This will marginally affect environmental light that happens to match the wavelengths that the second polarizer is configured to polarize, though this should not significantly affect the user's view of the outside environment. In other words, the second polarizer is configured to polarize the one or more narrow wavelength bands present in the image display light to have the second polarity without significantly affecting incident light outside of the narrow wavelength bands.

As with first polarizer 302 described above, second polarizer 506 may utilize any static or dynamic polarizing optics to achieve polarization of the image display light. For example, first polarity incident light having a suitable wavelength may be absorbed by the second polarizer, reflected, diffracted at an angle that carries the light away from the user eye, etc. Furthermore, the polarizing properties of the second polarizer may vary across the surface of the polarizer. In other words, some regions of the second polarizer (e.g., the center) may polarize light to have the second polarity, while other regions of the second polarizer (e.g., the edges) may polarize the light to have the first polarity, or may not polarize the light at all.

As discussed above, in some cases the first polarizer may be dynamically switchable to selectively increase or decrease the amount of environmental light that passes through the first polarizer toward the user eye. This may be achieved using any suitable polarizing optics that can be dynamically switched. This allows the user's view of the outside environment to be selectively dimmed, or even occluded entirely, during use of the NED. Furthermore, as discussed above, polarization of the environmental light by the first polarizer can reduce the apparent brightness of the outside environment from the user's perspective. This can be overcome by selectively increasing the amount of light that passes through the first polarizer, for example when the image source is off.

Figure 6A:
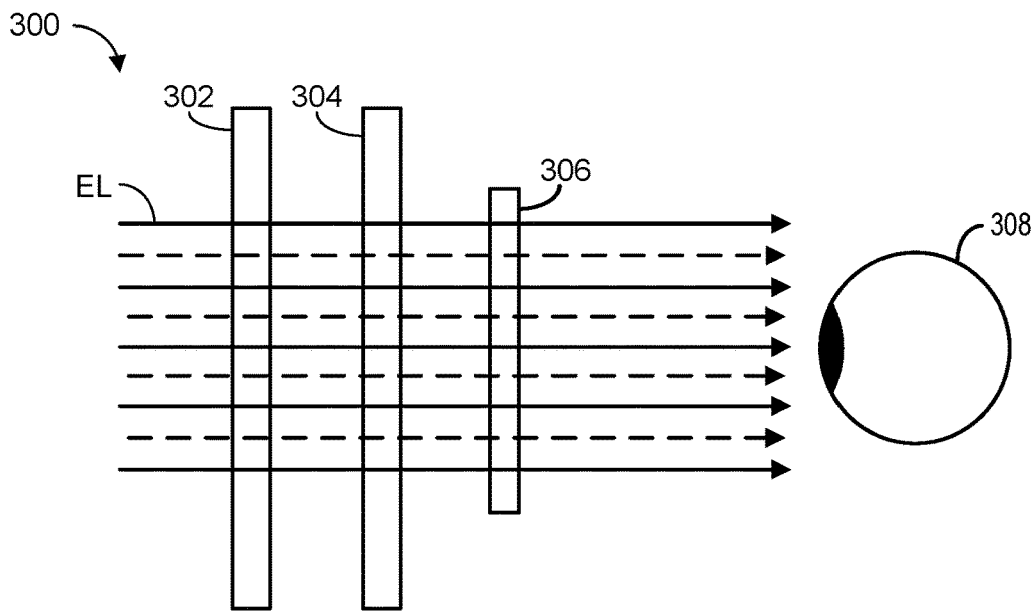
FIGS. 6A and 6B schematically illustrate switching of a polarizer to increase or decrease an amount of light passing through the polarizer.

This is schematically illustrated in FIGS. 6A and 6B, which again show polarization-based dynamic focuser 300. In FIG. 6A, first polarizer 302 has been dynamically switched to allow substantially all of the environmental light EL to pass through the first polarizer and reach user eye 308, including light having both the first and second polarities. This may be done at any time during use of the NED.

However, while image source 304 is on and the user is viewing virtual imagery, increasing the amount of environmental light that passes through the first polarizer may make it harder for the user to see the virtual imagery. The first polarizer may therefore be switched to increase the amount of environmental light that passes through the first polarizer when the image source is not outputting image display light. Furthermore, dynamic lens 306 may still selectively focus light having the second polarity. Thus, in FIG. 6A, image source 304 is off, and dynamic lens has been controlled such that it does not meaningfully affect light having either polarity. In this manner, when the user wears the NED while no virtual imagery is displayed (e.g., the device is powered off), the user may have a view of the outside environment that is substantially unaffected by the first polarizer, as well as other optical components of the polarization-based dynamic focuser.

Figure 6B:
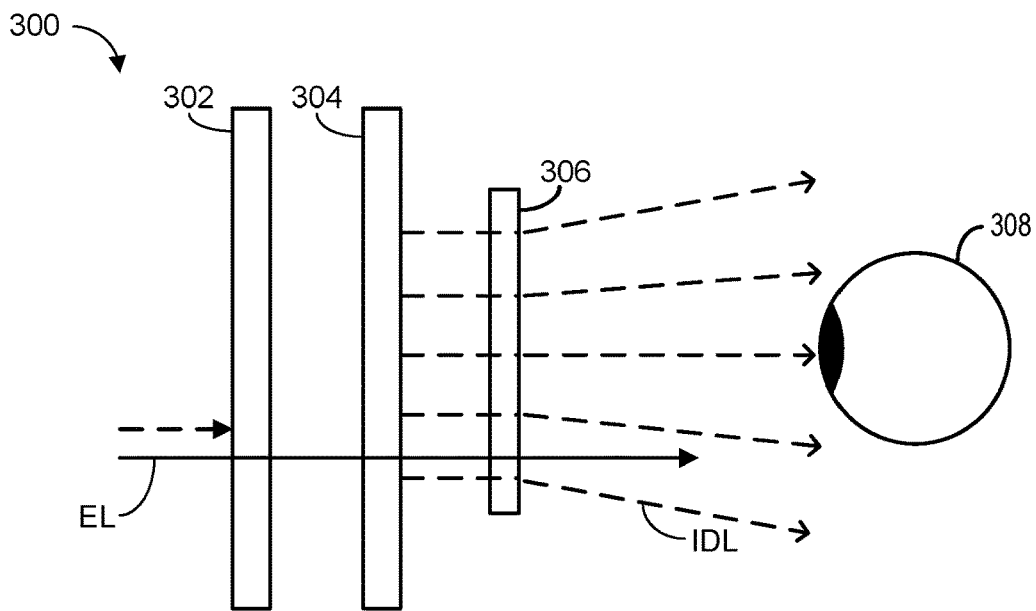

In contrast, in FIG. 6B, the first polarizer has been dynamically switched to block environmental light EL having the second polarity from passing through polarization-based dynamic focuser 300. Image source 304 is on and outputting image display light IDL toward the user eye. Thus, the user may review the virtual imagery while the amount of environmental light reaching the eye is reduced, making the virtual imagery easier to see.

FIG. 6A shows all environmental light passing through the first polarizer, while FIG. 6B shows first-polarity environmental light passing through the polarizer. It will be understood, however, that these are extreme examples. In alternate examples, the first polarizer may be dynamically switched to allow any portion of the environmental light to reach the user eye, allowing the user's view of the outside environment to be selectively dimmed or brightened as desired. Switching of the first polarizer may be achieved, for instance, when the first polarizer is constructed from suitable metamaterial technologies. In alternative implementations, a switchable waveplate positioned between two polarizers or a liquid crystal display may be used to achieve a similar effect—for example, allowing the environmental light to be completely occluded instead of selectively polarized.

Furthermore, control over the first polarizer may be achieved in any suitable way. In some examples, the first polarizer may be controlled by a controller (e.g., controller 210, controller 400, or logic machine 802) not shown in FIGS. 6A and 6B.

Figure 7A:
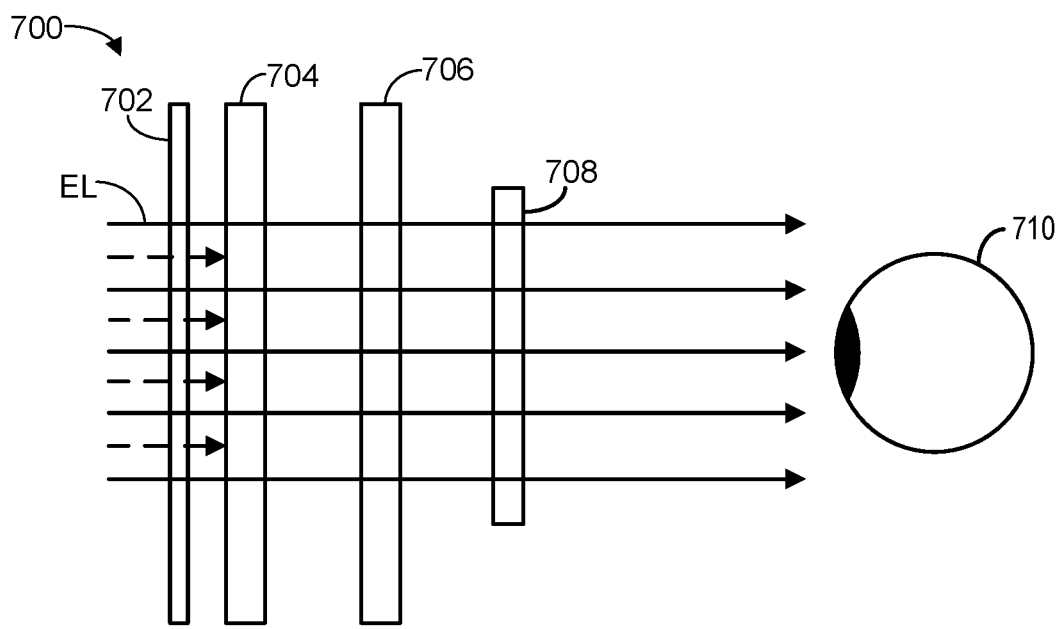
FIGS. 7A and 7B schematically depict another example polarization-based dynamic focuser including a polarization-based matrix display.
Figure 7B:
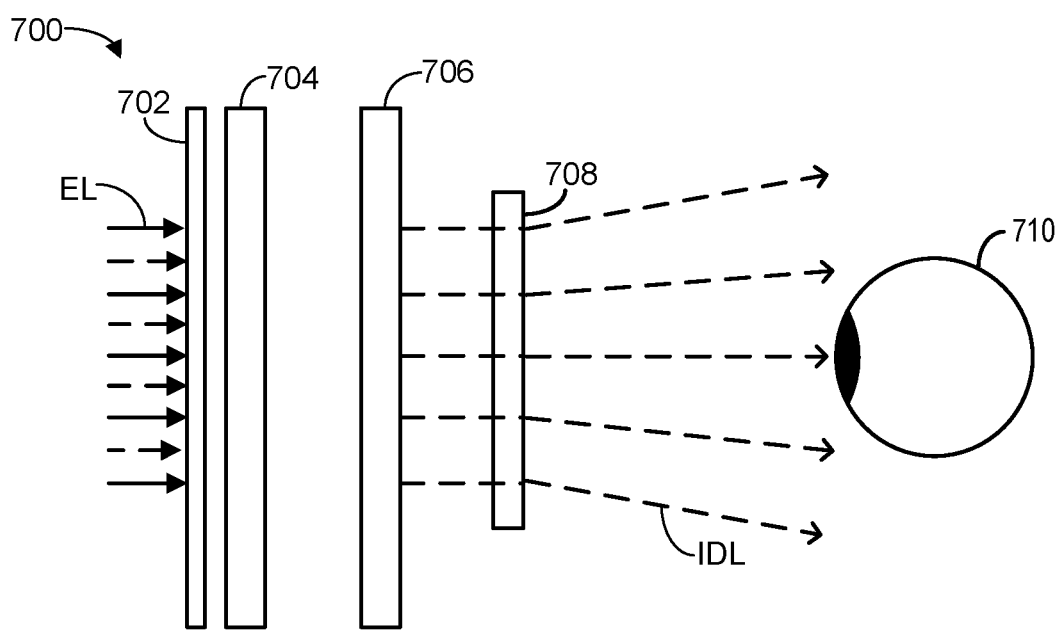

FIGS. 7A and 7B show another example polarization-based dynamic focuser 700. As with focuser 300, focuser 700 includes a first polarizer 704, an image source 706, a dynamic lens 708, and a user eye 710. However, focuser 700 also includes a polarization-based matrix display 702 configured to selectively prevent some or all of the environmental light from reaching the first polarizer. The polarization-based matrix display may be implemented using any suitable technology, such as liquid crystals, and may have any suitable resolution. Furthermore, the polarization-based matrix display may be controlled in any suitable manner, for example by a controller not shown in FIGS. 7A and 7B. While the polarization-based matrix display is shown in front of first polarizer 702, it will be understood that the polarization-based matrix display may have any suitable position relative to other components of the polarization-based dynamic focuser.

In FIG. 7A, polarization-based matrix display 702 is switched off and allows substantially all of the environmental light to reach the first polarizer. From here, environmental light having the first polarity continues through the polarization-based dynamic focuser to reach the user eye. No image display light is shown in FIG. 7A. However, this is done only for the sake of visual clarity. It will be understood that image display light may be output toward the user eye regardless of the current status of the polarization-based matrix display.

In FIG. 7B, the polarization-based matrix display is blocking all environmental light from reaching the first polarizer. Thus, the user's view of the outside environment may be completely occluded while viewing virtual imagery, resulting in a fully virtual reality experience. It will be understood that the polarization-based matrix display may be controlled to allow any amount of environmental light to reach the first polarizer, in turn allowing the user's view of the outside environment to be selectively dimmed as desired. Furthermore, the polarization-based matrix display may be configured to allow environmental light through some portions of the display while blocking light from passing through other portions of the display. In this manner the user's view of the outside environment may be spatially varied, for example allowing some portions of the user's view to be dimmed differently than others. This can be used, for example, to provide an illusion that virtual imagery formed by the image display light occludes real-world objects in the outside environment by spatially varying an amount of environmental light reaching the first polarizer.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
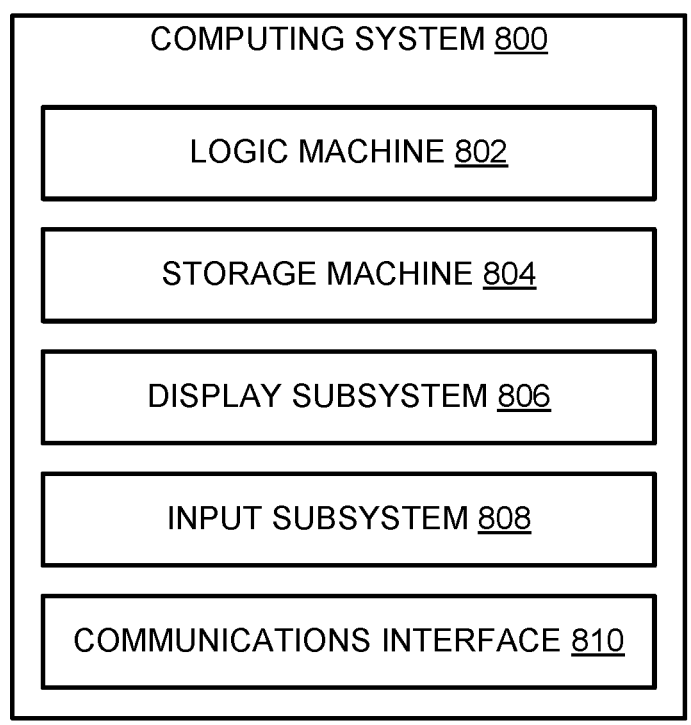
FIG. 8 schematically depicts an example computing system.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally, or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic machine 802 executing instructions held by storage machine 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

In an example, a polarization-based dynamic focuser for a near-eye display comprises: a first polarizer configured to polarize environmental light incident on the first polarizer, such that environmental light passing through the first polarizer toward a user eye has a first polarity; an image source positioned between the user eye and the first polarizer, the image source being substantially transparent to the environmental light, and the image source configured to output image display light toward the user eye, at least some of the image display light having a second polarity; and a dynamic lens positioned between the user eye and the image source, the dynamic lens configured to selectively focus incident light having the second polarity toward the user eye at a controllable virtual distance, where the dynamic lens does not affect incident light having the first polarity. In this example or any other example, substantially all of the image display light output by the image source has the second polarity. In this example or any other example, some but not all of the image display light output by the image source has the first polarity, and the polarization-based dynamic focuser further comprises a second polarizer positioned between the dynamic lens and the image source, the second polarizer configured to polarize one or more wavelengths of incident light to have the second polarity. In this example or any other example, the image display light includes one or more narrow wavelength bands, and the second polarizer is a narrowband polarizer configured to polarize the one or more narrow wavelength bands of the image display light to have the second polarity without affecting incident light outside of the one or more narrow wavelength bands. In this example or any other example, the first polarizer is a broadband polarizer configured to polarize substantially all visible wavelengths of environmental light incident on the broadband polarizer to have the first polarity. In this example or any other example, the image source includes a waveguide having surface relief gratings for outcoupling image display light from the waveguide. In this example or any other example, the image source further includes a microprojector configured to introduce image display light into the waveguide, and the waveguide replicates an exit pupil of the image display light. In this example or any other example, the polarization-based dynamic focuser further comprises an eye tracker configured to track a current gaze vector of the user eye, and the controllable virtual distance of the dynamic lens is set based on the current gaze vector. In this example or any other example, the image display light depicts a virtual image rendered by a software application, and the controllable virtual distance of the dynamic lens is set based on an indication of user focus provided by the software application. In this example or any other example, the first polarizer is switchable to selectively increase or decrease an amount of environmental light that passes through the first polarizer toward the user eye. In this example or any other example, the first polarizer is switched to increase the amount of environmental light that passes through the first polarizer when the image source is not outputting image display light. In this example or any other example, the polarization-based dynamic focuser further comprises a polarization-based matrix display configured to selectively prevent some or all of the environmental light from reaching the first polarizer. In this example or any other example, the polarization-based matrix display is further configured to provide an illusion that virtual imagery formed by the image display light occludes real-world objects in an outside environment by spatially varying an amount of environmental light reaching the first polarizer. In this example or any other example, the image source emits collimated light rays toward the user eye.

In an example, a polarization-based dynamic focuser for a near-eye display comprises: a first polarizer configured to polarize environmental light incident on the first polarizer, such that environmental light passing through the first polarizer toward a user eye has a first polarity; a waveguide positioned between the user eye and the first polarizer, the waveguide being substantially transparent to the environmental light, and the waveguide configured to output image display light toward the user eye such that at least some of the image display light has a second polarity; and a liquid crystal lens positioned between the user eye and the image source, the liquid crystal lens configured to selectively focus incident light having the second polarity toward the user eye at a controllable virtual distance, where the liquid crystal lens does not affect incident light having the first polarity. In this example or any other example, some but not all of the image display light output by the waveguide has the first polarity, and the polarization-based dynamic focuser further comprises a second polarizer positioned between the liquid crystal lens and the waveguide, the second polarizer configured to polarize one or more wavelengths of incident light to have the second polarity. In this example or any other example, the polarization-based dynamic focuser further comprises an eye tracker configured to track a current gaze vector of the user eye, and the controllable virtual distance of the liquid crystal lens is set based on the current gaze vector. In this example or any other example, the image display light depicts a virtual image rendered by a software application, and the controllable virtual distance of the liquid crystal lens is set based on an indication of user focus provided by the software application. In this example or any other example, the first polarizer is switchable to selectively increase or decrease an amount of environmental light that passes through the first polarizer toward the user eye.

In an example, a polarization-based dynamic focuser for a near-eye display comprises: a broadband polarizer configured to polarize substantially all visible wavelengths of environmental light incident on the broadband polarizer, such that environmental light passing through the broadband polarizer toward a user eye has a first polarity; an image source positioned between the user eye and the broadband polarizer, the image source being substantially transparent to the environmental light, and the image source configured to output image display light including one or more narrow wavelength bands toward the user eye, the image display light having both the first polarity and a second polarity; a narrowband polarizer positioned between the image source and the user eye, the narrowband polarizer configured to polarize the one or more narrow wavelength bands of the image display light to have the second polarity without affecting incident light outside of the one or more narrow wavelength bands; and a dynamic lens positioned between the user eye and the narrowband polarizer, the dynamic lens configured to selectively focus incident light having the second polarity toward the user eye at a controllable virtual distance, where the dynamic lens does not affect incident light having the first polarity.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A polarization-based dynamic focuser for a near-eye display, comprising:
a first polarizer configured to polarize environmental light incident on the first polarizer, such that environmental light passing through the first polarizer toward a user eye has a first polarity;
an image source including a waveguide positioned between the user eye and the first polarizer, the waveguide being substantially transparent to the environmental light, and the waveguide configured to output image display light toward the user eye, at least some of the image display light having the first polarity and at least some of the image display light having a second polarity;
a dynamic lens positioned between the user eye and the waveguide the dynamic lens configured to selectively focus incident light having the second polarity toward the user eye at a controllable virtual distance, where the dynamic lens does not affect incident light having the first polarity; and
a second polarizer positioned between the dynamic lens and the waveguide, the second polarizer configured to polarize one or more wavelengths of incident light to have the second polarity.

2. The polarization-based dynamic focuser of claim 1, where the image display light includes one or more narrow wavelength bands, and the second polarizer is a narrowband polarizer configured to polarize the one or more narrow wavelength bands of the image display light to have the second polarity without affecting incident light outside of the one or more narrow wavelength bands.

3. The polarization-based dynamic focuser of claim 1, where the first polarizer is a broadband polarizer configured to polarize substantially all visible wavelengths of environmental light incident on the broadband polarizer to have the first polarity.

4. The polarization-based dynamic focuser of claim 1, where the waveguide includes surface relief gratings for outcoupling image display light from the waveguide.

5. The polarization-based dynamic focuser of claim 4, where the image source further includes a microprojector configured to introduce image display light into the waveguide, and the waveguide replicates an exit pupil of the image display light.

6. The polarization-based dynamic focuser of claim 1, further comprising an eye tracker configured to track a current gaze vector of the user eye, and where the controllable virtual distance of the dynamic lens is set based on the current gaze vector.

7. The polarization-based dynamic focuser of claim 1, where the image display light depicts a virtual image rendered by a software application, and where the controllable virtual distance of the dynamic lens is set based on an indication of user focus provided by the software application.

8. The polarization-based dynamic focuser of claim 1, where the first polarizer is switchable to selectively increase or decrease an amount of environmental light that passes through the first polarizer toward the user eye.

9. The polarization-based dynamic focuser of claim 8, where the first polarizer is switched to increase the amount of environmental light that passes through the first polarizer when the image source is not outputting image display light.

10. The polarization-based dynamic focuser of claim 1, further comprising a polarization-based matrix display configured to selectively prevent some or all of the environmental light from reaching the first polarizer.

11. The polarization-based dynamic focuser of claim 10, where the polarization-based matrix display is further configured to provide an illusion that virtual imagery formed by the image display light occludes real-world objects in an outside environment by spatially varying an amount of environmental light reaching the first polarizer.

12. The polarization-based dynamic focuser of claim 1, where the image source emits collimated light rays toward the user eye.

13. A polarization-based dynamic focuser for a near-eye display, comprising:
a first polarizer configured to polarize environmental light incident on the first polarizer, such that environmental light passing through the first polarizer toward a user eye has a first polarity;
a waveguide positioned between the user eye and the first polarizer, the waveguide being substantially transparent to the environmental light, and the waveguide configured to output image display light toward the user eye such that at least some of the image display light has the first polarity and at least some of the image display light has a second polarity;
a liquid crystal lens positioned between the user eye and the waveguide, the liquid crystal lens configured to selectively focus incident light having the second polarity toward the user eye at a controllable virtual distance, where the liquid crystal lens does not affect incident light having the first polarity; and
a second polarizer positioned between the liquid crystal lens and the waveguide, the second polarizer configured to polarize one or more wavelengths of incident light to have the second polarity.

14. The polarization-based dynamic focuser of claim 13, further comprising an eye tracker configured to track a current gaze vector of the user eye, and where the controllable virtual distance of the liquid crystal lens is set based on the current gaze vector.

15. The polarization-based dynamic focuser of claim 13, where the image display light depicts a virtual image rendered by a software application, and where the controllable virtual distance of the liquid crystal lens is set based on an indication of user focus provided by the software application.

16. The polarization-based dynamic focuser of claim 13, where the first polarizer is switchable to selectively increase or decrease an amount of environmental light that passes through the first polarizer toward the user eye.

17. A polarization-based dynamic focuser for a near-eye display, comprising:
a broadband polarizer configured to polarize substantially all visible wavelengths of environmental light incident on the broadband polarizer, such that environmental light passing through the broadband polarizer toward a user eye has a first polarity;

an image source including a waveguide positioned between the user eye and the broadband polarizer, the waveguide being substantially transparent to the environmental light, and the waveguide configured to output image display light including one or more narrow wavelength bands toward the user eye, the image display light having both the first polarity and a second polarity;

a narrowband polarizer positioned between the image source and the user eye, the narrowband polarizer configured to polarize the one or more narrow wavelength bands of the image display light to have the second polarity without affecting incident light outside of the one or more narrow wavelength bands; and a dynamic lens positioned between the user eye and the narrowband polarizer, the dynamic lens configured to selectively focus incident light having the second polarity toward the user eye at a controllable virtual distance, where the dynamic lens does not affect incident light having the first polarity.

\* \* \* \* \*